US010392019B2

(12) United States Patent
Maeda et al.

(10) Patent No.: US 10,392,019 B2
(45) Date of Patent: Aug. 27, 2019

(54) VEHICLE CONTROLLER

(71) Applicant: JTEKT CORPORATION, Osaka-shi, Osaka (JP)

(72) Inventors: Shingo Maeda, Okazaki (JP); Terutaka Tamaizumi, Okazaki (JP); Jun Hasegawa, Okazaki (JP); Masayuki Kita, Okazaki (JP); Gempei Nakasone, Nisshin (JP); Hiromasa Tamaki, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 180 days.

(21) Appl. No.: 15/668,294

(22) Filed: Aug. 3, 2017

(65) Prior Publication Data
US 2018/0057009 A1 Mar. 1, 2018

(30) Foreign Application Priority Data

Aug. 25, 2016 (JP) .................. 2016-164750
Oct. 17, 2016 (JP) .................. 2016-203862

(51) Int. Cl.
*B60W 30/18* (2012.01)
*B62D 1/28* (2006.01)
(Continued)

(52) U.S. Cl.
CPC ...... *B60W 30/18163* (2013.01); *B60W 30/12* (2013.01); *B60W 50/087* (2013.01);
(Continued)

(58) Field of Classification Search
CPC ........... B60W 30/18163; B60W 30/12; B60W 50/087; B60W 50/10; B62D 1/286; B62D 15/025
(Continued)

(56) References Cited

U.S. PATENT DOCUMENTS

2007/0288142 A1* 12/2007 Maeda .................. B62D 1/286
701/41
2008/0091320 A1* 4/2008 Sakai ..................... B62D 1/286
701/42
(Continued)

FOREIGN PATENT DOCUMENTS

EP      2 952 414 A1    12/2015
JP      2009-214680 A    9/2009

OTHER PUBLICATIONS

Dec. 22, 2017 European Search Report issued in European Patent Application No. 17185749.3.

*Primary Examiner* — Gertrude Arthur Jeanglaude
(74) *Attorney, Agent, or Firm* — Oliff PLC

(57) ABSTRACT

An ECU includes a deviation calculating circuit an assist control circuit, an automatic steering control circuit including an intervention determination switching circuit, an adder, a current command value calculating circuit The intervention determination switching circuit includes a count amount calculating circuit, an adder, an immediately-preceding count amount output circuit, a switching determination circuit, and an output switching circuit. The count amount calculating circuit calculates a count amount having a positive value or a negative value based on a steering torque absolute value calculated by an absolute value switching circuit. The adder calculates a total count amount that is the total sum of a presently calculated count amount and an immediately-preceding count amount calculated in an immediately-preceding calculation cycle. The switching determination circuit determines a driver's intention to intervene in steering, based on whether the total count amount is equal to or greater than a count amount threshold value.

5 Claims, 7 Drawing Sheets

(51) Int. Cl.
   *B62D 15/02*   (2006.01)
   *B60W 30/12*   (2006.01)
   *B60W 50/08*   (2012.01)
   *B60W 50/10*   (2012.01)

(52) U.S. Cl.
   CPC ............ *B60W 50/10* (2013.01); *B62D 1/286* (2013.01); *B62D 15/025* (2013.01)

(58) Field of Classification Search
   USPC .......................................................... 701/41
   See application file for complete search history.

(56) References Cited

U.S. PATENT DOCUMENTS

2009/0140502 A1\* 6/2009 Sasaki .................... B62D 7/146
                                                              280/5.522
2012/0239255 A1    9/2012 Kojima et al.

\* cited by examiner

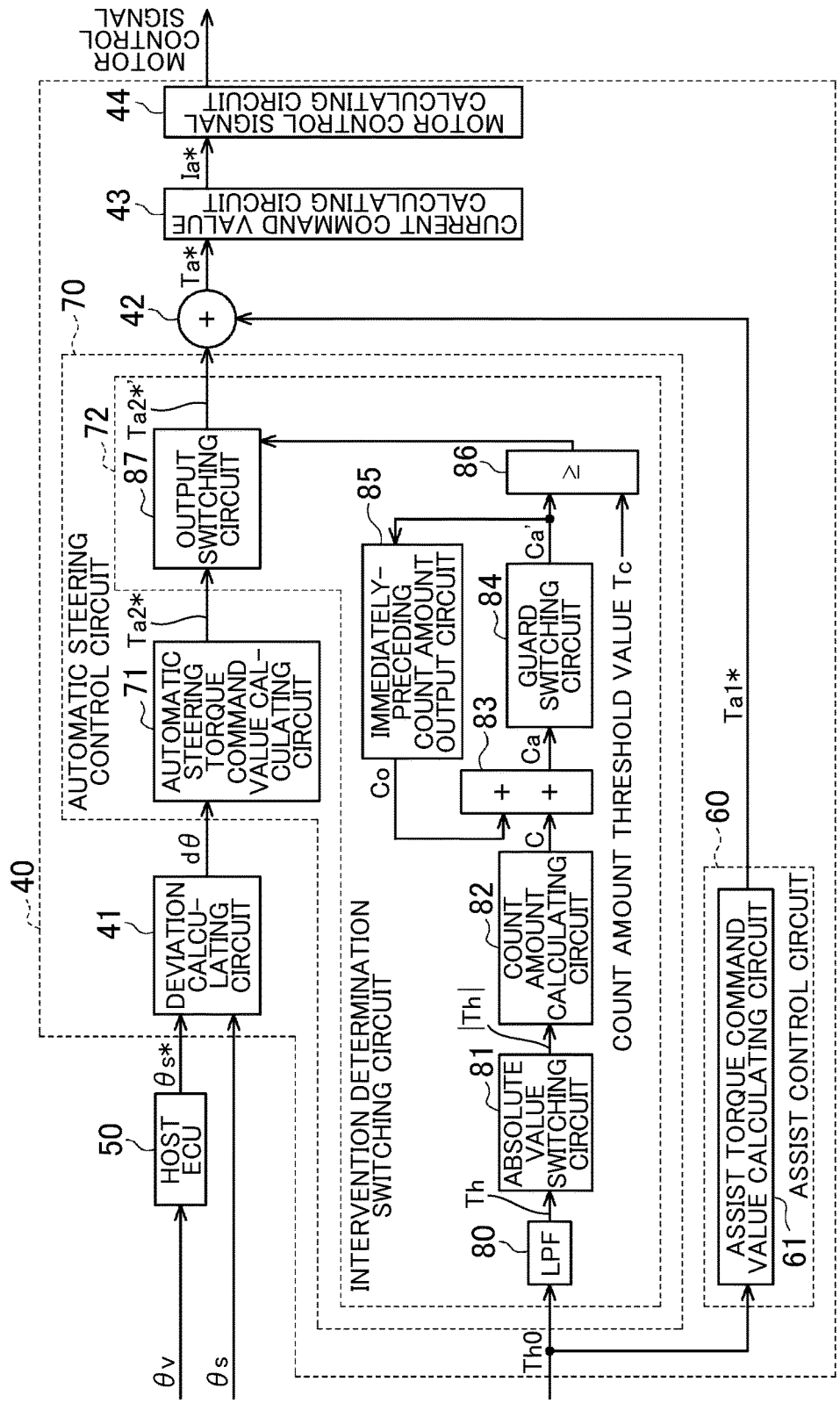

VEHICLE CONTROLLER

INCORPORATION BY REFERENCE

The disclosure of Japanese Patent Application No. 2016-164750 filed on Aug. 25, 2016 and Japanese Patent Application No. 2016-203862 filed on Oct. 17, 2016, each including the specification, drawings and abstract, is incorporated herein by reference in its entirety.

BACKGROUND OF THE INVENTION

1. Field of the Invention

The invention relates to a vehicle controller.

2. Description of the Related Art

Some vehicle steering apparatuses are provided with a lane departure prevention support system that is configured to prevent a vehicle from departing from a lane while the vehicle is traveling, and that is an example of an autonomous driving system (see, for example, Japanese Patent Application Publication No. 2009-214680 (JP 2009-214680 A)). According to JP 2009-214680 A, while control associated with the lane departure prevention support system is being executed, the control associated with the lane departure prevention support system is stopped depending on the steering state of a steering wheel operated by a driver. When a steering torque applied to the steering wheel by a driver is equal to or higher than a threshold value, it is determined that the driver has an intention to intervene in the steering by the lane departure prevention support system, and then the control associated with the lane departure prevention support system is stopped so that the driver is allowed to steer steered wheels according to his/her own intention.

While a driver is holding the steering wheel, a steering torque is applied to the steering wheel even if the driver does not have an intention to intervene in the steering by the lane departure prevention support system. Therefore, when it is determined whether a driver has an intention to intervene in the steering based on whether a steering torque is equal to or higher than a threshold value, there is a possibility that whether the driver has an intention to intervene in the steering will not be accurately determined. For example, even if a driver does not have an intention to intervene in the steering, there is a possibility that it will be erroneously determined that the driver has an intention to intervene in the steering, due to a steering torque that is generated due to the driver's hold of the steering wheel.

SUMMARY OF THE INVENTION

One object of the invention is to provide a vehicle controller configured to more accurately determine a driver's intention to intervene in steering by an autonomous driving system.

An aspect of the invention relates to a vehicle controller configured to control an actuator that generates power for steering steered wheels and that applies the power to a steering mechanism of a vehicle. The vehicle controller is configured to control the actuator using at least one of a first component that is a command calculated based on an operation state quantity that varies in response to a driver's operation of the steering mechanism and a second component that is a command calculated based on a vehicle surrounding environment. The vehicle controller includes: a count amount calculating circuit configured to calculate a count amount that is an index for determining whether a driver has indicated an intention to intervene in the steering steered wheels, based on the operation state quantity; a sum calculating circuit configured to calculate a sum by adding together the count amount calculated by the count amount calculating circuit and the count amount calculated in a prescribed past period by the count amount calculating circuit; a determination circuit configured to determine whether or not the driver has an intention to intervene in the steering based on whether or not the sum calculated by the sum calculating circuit is equal to or greater than a count amount threshold value; and a switching circuit configured to decrease the second component when the determination circuit determines that the driver has an intention to intervene in the steering, and configured to maintain the second component when the determination circuit determines that the driver does not have an intention to intervene in the steering.

According to the above aspect, the determination circuit determines whether a driver has an intention to intervene in the steering based on whether the sum obtained by adding together the count amount and the count amount calculated in the prescribed past period is greater than or equal to the count amount threshold value. According to the above aspect, whether the driver has an intention to intervene in the steering can be determined based on whether the sum obtained by continuously adding together the count amounts is equal to or greater than the count amount threshold value. Thus, it is possible to determine the driver's intention to intervene in the steering more accurately than in a case where whether a driver has an intention to intervene in the steering is determined based on whether a count amount is equal to or greater than a threshold value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a control block diagram in a vehicle controller according to a first embodiment;

DETAILED DESCRIPTION OF EMBODIMENTS

Figure 1:
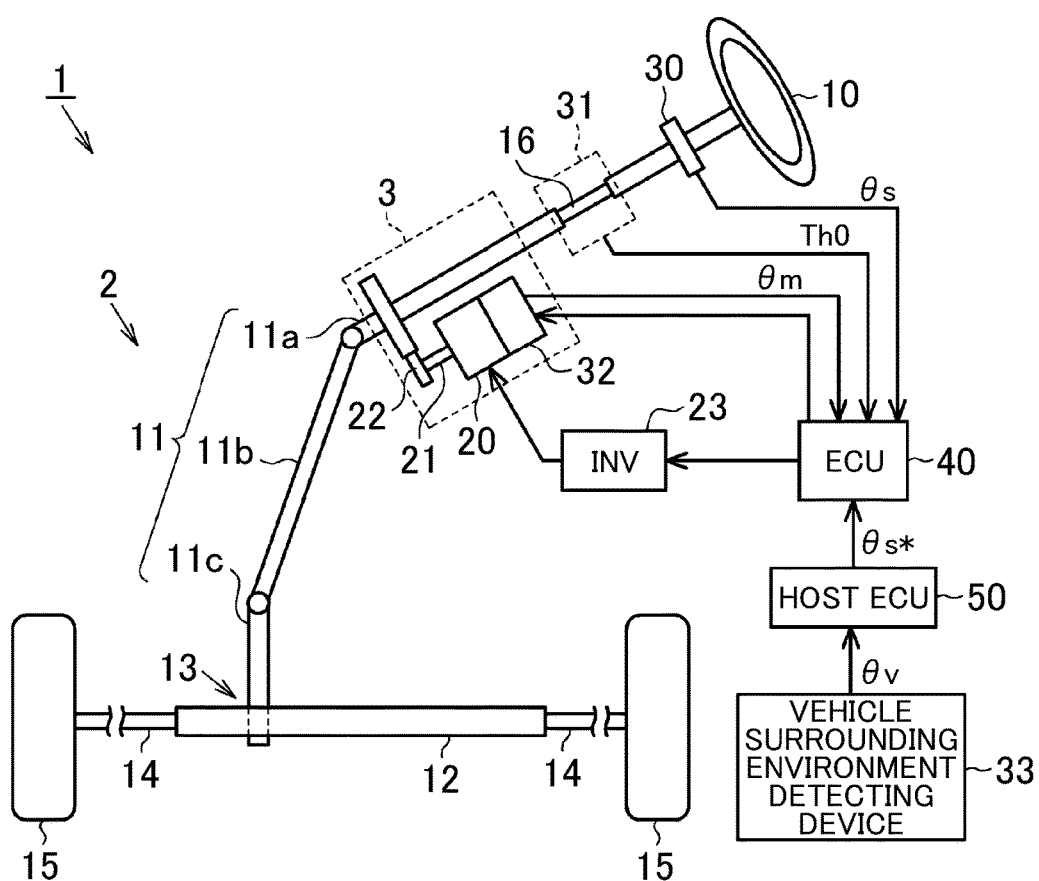
FIG. 1 is a diagram schematically illustrating the configuration of a vehicle steering operation system provided with a vehicle controller.

Hereinafter, a vehicle controller according to a first embodiment of the invention will be described. As illustrated in FIG. 1, a vehicle steering operation system 1 includes a steering mechanism 2 that steers steered wheels 15 in response to a driver's operation of a steering wheel 10, an actuator 3 that applies power to a steering shaft 11, and an electronic control unit (ECU) 40, which may function as a vehicle controller that controls the actuator 3. The vehicle steering operation system 1 constitutes a lane departure prevention support system that suppresses a vehicle from departing from a lane in which the vehicle is traveling, for example, by applying power for automatically changing the traveling direction of the vehicle to the steering mechanism 2.

The steering mechanism 2 includes the steering wheel 10 that is operated by a driver, and a steering shaft 11 that rotates together with the steering wheel 10 in an integrated manner. The steering shaft 11 includes a column shaft 11a connected to the steering wheel 10, an intermediate shaft 11b connected to a lower end portion of the column shaft 11a, and a pinion shaft 11c connected to a lower end portion of the intermediate shaft 11b. A lower end portion of the pinion shaft 11c is connected to a rack shaft 12 via a rack-and-pinion mechanism 13. The rotary motion of the steering shaft 11 is converted into a reciprocating linear motion in the axial direction of the rack shaft 12 via the rack-and-pinion mechanism 13. The reciprocating linear motion is transmitted to the right and left steered wheels 15 via tie rods 14 connected to respective ends of the rack shaft 12, whereby the steered angle of the steered wheels 15 is varied.

The actuator 3 includes a motor 20 serving as a source of power to be applied to the steering mechanism 2. A rotary shaft 21 of the motor 20 is connected to the column shaft 11a via a speed-reducer 22. For example, a three-phase brushless motor is employed as the motor 20. The speed-reducer 22 reduces the speed of rotation output from the motor 20, and transmits the rotation having a reduced speed to the column shaft 11a. That is, the rotational force (torque) generated by the motor 20 is applied, as power (steering force), to the steering shaft 11, whereby the steered angle of the right and left steered wheels 15 is varied.

The actuator 3 is connected via an inverter 23 to the ECU 40, which may function as a vehicle controller that controls driving of the motor 20. The inverter 23 includes a plurality of switching devices (metal-oxide-semiconductor (MOS) field-effect transistors) configured to open and close a power supply path extending from an electric power source, such as a battery of the vehicle, to the motor. The inverter 23 supplies currents to the motor 20 by switching the on-off state of each switching device.

The ECU 40 controls the amount of current to be supplied to the motor 20 by controlling switching of the on-off state of each switching device of the inverter 23 based on detection results from various sensors provided in the vehicle. Examples of the various sensors include a steering angle sensor 30, a torque sensor 31, and a rotation angle sensor 32. The steering angle sensor 30 and the torque sensor 31 are disposed, for example, on the column shaft 11a. For example, the motor 20 is provided with the rotation angle sensor 32. The steering angle sensor 30 detects a steering angle $\theta s$, which is a rotation angle of the column shaft 11a operated in response to a driver's steering operation. The torque sensor 31 detects a steering torque Th0 that is applied to the steering shaft 11 based on a torsion between an upper portion of a torsion bar 16 in the column shaft 11a and a lower portion of the torsion bar 16 in the column shaft 11a. The torsion is generated in response to a driver's steering operation. The rotation angle sensor 32 detects a rotation angle $\theta m$ of the rotary shaft 21. There is a correlation between the steering angle $\theta s$ and the steered angle of the steered wheels 15. Thus, the steering angle $\theta s$ can be converted into the steered angle of the steered wheels 15.

The ECU 40 is connected to a host electronic control unit (ECU 50) mounted in the vehicle. The host ECU 50 notifies the ECU 40 of a command for executing automatic steering control to automatically change the traveling direction of the vehicle.

The host ECU 50 outputs an angle command value $\theta s^*$, which is used for automatic steering control, to the ECU 40 based on a detected value detected by a vehicle surrounding environment detecting device 33. The detected value is a value detected based on an environment surrounding the host vehicle (e.g., road surface information, and an obstacle). In the present embodiment, for example, traffic lane line information about roads is used as the vehicle surrounding environment. The vehicle surrounding environment detecting device 33 calculates angle information $\theta v$ based on detected values acquired from a global positioning system (GPS) including a car navigation system disposed in the vehicle, other in-vehicle sensors (e.g., a camera, a distance sensor, a yaw rate sensor, and a laser), and vehicle-to-road communication. The angle information $\theta v$ indicates, for example, an angle of the traveling direction of the vehicle relative to the traffic lane line of the road based on the traffic lane line information. That is, the angle information $\theta v$ indicates a steered angle of the steered wheels 15 with respect to the traveling direction of the vehicle (the extending direction of the traffic lane line). Therefore, the steering angle $\theta s$, which can be converted into the steered angle of the steered wheels 15, is a component indicating the actual traveling direction of the vehicle. The angle command value $\theta s^*$ is a target value of the component indicating the traveling direction of the vehicle. The host ECU 50 calculates the angle command value $\theta s^*$ at prescribed intervals and outputs the calculated angle command value $\theta s^*$ to the ECU 40.

The ECU 40 executes automatic steering control when an automatic steering mode is set. The ECU 40 executes assist control for applying an assist force corresponding to a driver's steering operation when a manual steering mode is set (i.e., when the automatic steering mode is not set). When a driver intervenes in the steering operation by the automatic steering control (steering intervention) while the automatic steering control is being executed, the ECU 40 stops the automatic steering control and starts control for assisting a steering operation. The ECU 40 invalidates the angle command value $\theta s^*$ output from the host ECU 50 while the assist control is being executed.

The configuration of the ECU 40 will be described below in detail. The ECU 40 detects various state quantities at prescribed sampling intervals and generates a motor control signal based on the detected state quantities. As illustrated in FIG. 2, the ECU 40 includes a deviation calculating circuit 41, an assist control circuit 60, an automatic steering control circuit 70, an adder 42, a current command value calculating circuit 43, and a motor control signal calculating circuit 44.

The deviation calculating circuit 41 calculates an angle deviation $d\theta$ that is a difference between the angle command value $\theta s^*$ calculated by the host ECU 50 and the steering angle θs calculated through the steering angle sensor 30. The assist control circuit 60 includes an assist torque command value calculating circuit 61. The assist torque command value calculating circuit 61 calculates a first component Ta1* that is a target value of an amount of current corresponding to an assist torque (power) to be generated by the motor 20, based on the steering torque Th0 acquired from the torque sensor 31.

The automatic steering control circuit 70 includes an automatic steering torque command value calculating circuit 71 and an intervention determination switching circuit 72. The automatic steering torque command value calculating circuit 71 calculates a second component Ta2* that is a target value of an amount of current corresponding to the automatic steering torque (power) to be generated by the motor 20, based on the angle deviation dθ acquired from the deviation calculating circuit 41.

The intervention determination switching circuit 72 calculates a second component Ta2*' that is adjusted based on the degree of the driver's intervention in the automatic steering (an intention to intervene in the steering). The intervention determination switching circuit 72 includes a low-pass filter (LPF) 80, an absolute value switching circuit 81, a count amount calculating circuit 82 (a correction amount calculating circuit), an adder 83, a guard switching circuit 84, an immediately-preceding count amount output circuit 85, a switching determination circuit 86, and an output switching circuit 87.

The low-pass filter 80 calculates a filtered steering torque Th that is a value obtained by executing a low-pass filtering process on the steering torque Th0 detected by the torque sensor 31. By executing the low-pass filtering process, a high-frequency component of the steering torque Th0, which is not considered to be generated by a driver's steering operation, is reduced.

The absolute value switching circuit 81 calculates a steering torque absolute value |Th| that is an absolute value of the steering torque Th that has been subjected to the low-pass filtering process. The count amount calculating circuit 82 calculates a count amount C (a correction amount) having a positive value or a negative value, based on the steering torque absolute value |Th| calculated by the absolute value switching circuit 81. The count amount C is an index for determining whether a driver has indicated an intention to intervene in the steering.

Figure 3A:
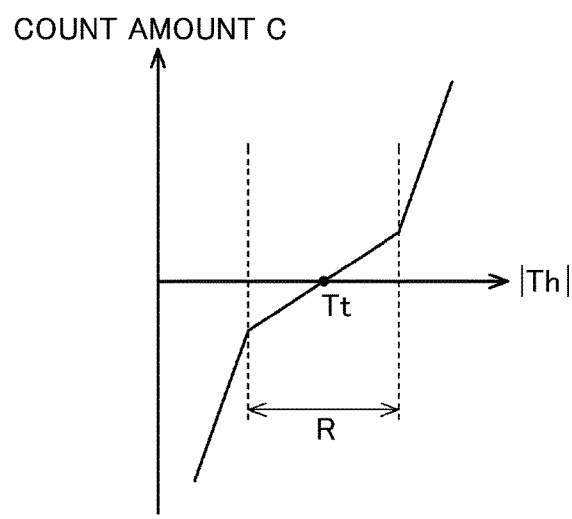
FIG. 3A is a graph illustrating the relationship between the absolute value of the steering torque and the count amount in the vehicle controller according to the first embodiment.

Specifically, as illustrated in FIG. 3A, when the steering torque absolute value |Th| is greater than a threshold value Tt, the count amount calculating circuit 82 calculates a count amount C having a positive value, whereas when the steering torque absolute value |Th| is less than the threshold value Tt, the count amount calculating circuit 82 calculates a count amount C having a negative value. When the steering torque absolute value |Th| is greater than the threshold value Tt, the count amount C increases in the positive direction with an increase in the steering torque absolute value |Th|. When the steering torque absolute value |Th| is less than the threshold value Tt, the count amount C increases in the negative direction with a decrease in the steering torque absolute value |Th|. A slope (rate of variation) of the count amount C with respect to the steering torque absolute value |Th| when the steering torque absolute value |Th| is in the vicinity of the threshold value Tt (for example, in a region R in FIG. 3A) is smaller than a slope of the count amount C with respect to the steering torque absolute value |Th| when the steering torque absolute value |Th| is not in the vicinity of the threshold value Tt. That is, the slope of the count amount C with respect to the steering torque absolute value |Th| increases as the steering torque absolute value |Th| is deviated from the threshold value Tt by a larger amount. This is because, when the steering torque absolute value |Th| is much greater than the threshold value Tt, it is almost surely considered that the driver performs a steering operation and the count amount calculating circuit 82 calculates a count amount C having a larger value, whereas when the steering torque absolute value |Th| is in the vicinity of the threshold value Tt, it is not sure whether the driver performs a steering operation and thus the count amount calculating circuit 82 calculates a count amount C having a smaller value. Thus, when the steering torque absolute value |Th| is in the vicinity of the threshold value Tt, it is possible to prevent the situation where the count amount is varied by only a slight variation in the steering torque absolute value |Th| due to a driver's unintentional steering operation (e.g., slight hand vibration).

As illustrated in FIG. 2, the adder 83 (an example of "sum calculating circuit") calculates a total count amount Ca that is the total sum of the count amount C calculated by the count amount calculating circuit 82 in the present calculation cycle and the immediately-preceding count amount Co output from the immediately-preceding count amount output circuit 85. The total count amount Ca is adjusted by adding the count amount C in the present calculation cycle to the immediately-preceding count amount Co. The value of the count amount C increases as the degree of the driver's intervention in the automatic steering control increases. Thus, the value of the total count amount Ca increases as the degree of the driver's intervention in the automatic steering control increases.

When the total count amount Ca calculated by the adder 83 has a negative value, the guard switching circuit 84 calculates a total count amount Ca' through limitation of the lower limit. That is, when the total count amount Ca calculated by the adder 83 has a negative value, the guard switching circuit 84 outputs the total count amount Ca' obtained by setting the lower limit of the total count amount Ca to zero (0). The count amount C calculated by the count amount calculating circuit 82 may have a negative value instead of a positive value, Thus, the total count amount Ca calculated by the adder 83 may have a negative value.

The immediately-preceding count amount output circuit 85 stores the present total count amount Ca' calculated by the guard switching circuit 84, as an immediately-preceding count amount Co that is used in a next calculation cycle, and outputs the stored immediately-preceding count amount Co to the adder 83 in the next calculation cycle.

The switching determination circuit 86 (an example of "determination circuit") switches the automatic steering control to control including the manual steering control based on the total count amount Ca' acquired from the guard switching circuit 84 and a count amount threshold value Tc. Specifically, when the total count amount Ca' is equal to or greater than the count amount threshold value Tc, the switching determination circuit 86 determines that the degree of the driver's intervention in the automatic steering control is high, and notifies the output switching circuit 87 that the second component Ta2* calculated by the automatic steering torque command value calculating circuit 71 is decreased. When the total count amount Ca' is less than the count amount threshold value Tc, the switching determination circuit 86 determines that the degree of the driver's intervention in the automatic steering control is low (the driver has an intention not to intervene in the automatic steering control), and notifies the output switching circuit 87 that the second component Ta2* calculated by the automatic steering torque command value calculating circuit 71 is not decreased. The count amount threshold value Tc is a value that is empirically set in advance in order to determine whether an intervention operation is performed while the automatic steering control is being executed. When total count amount Ca has a negative value, a time lag of the determination that is executed by the switching determination circuit 86 (described later) increases. In view of this, the lower limit of the total count amount Ca is set to zero by the guard switching circuit 84, and thus a determination that is executed by the switching determination circuit 86 is more rapidly executed.

When the output switching circuit 87 receives, from the switching determination circuit 86, a notification that the second component Ta2* calculated by the automatic steering torque command value calculating circuit 71 is decreased, the output switching circuit 87 outputs the decreased second component Ta2* to the adder 42. When the output switching circuit 87 receives, from the switching determination circuit 86, a notification that the second component Ta2* calculated by the automatic steering torque command value calculating circuit 71 is not decreased, the output switching circuit 87 outputs the second component Ta2* as it is, to the adder 42.

The adder 42 calculates a total component Ta* that is the total sum of the first component Ta1* calculated by the assist torque command value calculating circuit 61 of the assist control circuit 60 and the second component Ta2* calculated by the output switching circuit 87 of the automatic steering control circuit 70.

The current command value calculating circuit 43 calculates a current command value Ia* corresponding to the total component Ta* calculated by the adder 42, The motor control signal calculating circuit 44 generates a motor control signal to be output to the inverter 23 (see FIG. 1), by executing current feedback control based on a deviation between the current command value Ia* and the actual current value, such that the actual current value supplied to the motor 20 follows the current command value Ia*.

The operations and advantageous effects of the present embodiment will be described below. In the vehicle steering operation system 1, the second component Ta2* calculated by the automatic steering torque command value calculating circuit 71 is decreased when the total count amount Ca' is equal to or greater than the count amount threshold value Tc. Thus, a driver can intervene in the automatic steering control. Because the total count amount Ca (Ca') is calculated using the count amount C calculated based on the steering torque absolute value |Th|, the count amount threshold value Tc can be flexibly set. For example, when a driver needs to be allowed to more rapidly intervene in the automatic steering control, the count amount threshold value Tc is set to a smaller value. When the driver's intervention in the automatic steering control needs to be more accurately determined, the count amount threshold value Tc is set to a larger value. The threshold value Tt can be flexibly set depending on how the relationship of the count amount C with respect to the steering torque absolute value |Th| needs to be set. Thus, it is possible to ensure a sufficient degree of flexibility in setting the count amount threshold value Tc and the threshold value Tt.

In contrast to this, a comparative example will be described below. In the comparative example, a driver's intention to intervene in the automatic steering control is determined based on whether the steering torque absolute value |Th| is greater than a threshold value. In this case, it is necessary to set the threshold value Tt in consideration of the steering torque that is naturally generated due to the driver's hold of the steering wheel 10. The threshold value cannot be set in a region between a steering torque absolute value |Th| that is zero and a steering torque absolute value |Th| that is generated due to a driver's hold of the steering wheel 10. Thus, the degree of flexibility in set the threshold value decreases.

In the present embodiment, when the degree of the driver's intervention in the automatic steering control is low and thus the steering torque absolute value |Th| is much smaller than the threshold value Tt, the count amount C calculated by the count amount calculating circuit 82 increases in the negative direction as the steering torque absolute value |Th| decreases. Thus, the total count amount C1' is prevented from being equal to or greater than the count amount threshold value Tc.

A comparative example will be described below. In the comparative example, a driver's intention to intervene in the automatic steering control is determined based on whether the steering torque absolute value |Th| is greater than the threshold value Tt. In this case, even when the count amount C is increased in the positive direction only one time due to an influence of noise or the like, there is a possibility that it will be determined that the driver has a strong intention to intervene in the automatic steering control. In view of this, in the present embodiment, a driver's intention to intervene in the automatic steering control is determined based on whether the total count amount Ca' is equal to or greater than the count amount threshold value Tc. Thus, even when the count amount C is increased in the positive direction only one time due to an influence of noise or the like, it is possible to prevent the situation where the driver's intention to intervene in the automatic steering control is immediately determined to be strong. Thus, it is possible to more accurately determine a driver's intention to intervene in the automatic steering control.

In the present embodiment, when the count amount C calculated by the count amount calculating circuit 82 is continuously output as a positive value and thus the total count amount Ca exceeds the count amount threshold value Tc, it is determined that the driver has an intention to intervene in the automatic steering control. Thus, it is possible to more accurately determine a driver's intention to intervene in the automatic steering control, than in a case where the driver's intention to intervene in the automatic steering control is determined when the count amount C (steering torque) exceeds the threshold value only one time.

The magnitude of the calculated count amount C varies based on an amount by which the steering torque Th0 (the steering torque absolute value |Th|) is greater than the threshold value Tt. Thus, when the degree of the driver's intervention in the automatic steering control is high and thus the steering torque absolute value |Th| is much greater than the threshold value Tt, the count amount C calculated by the count amount calculating circuit 82 increases in the positive direction as the steering torque absolute value |Th| increases. Thus, the time required for the total count amount Ca' to exceed the count amount threshold value Tc is shorter than that in a case where the degree of intervention is such a degree that the steering torque absolute value |Th| is slightly greater than the threshold value Tt. Thus, it is possible to more rapidly and accurately determine the degree of the driver's intervention in the automatic steering control.

When the steering torque absolute value |Th| is in the vicinity of the threshold value Tt, there is a possibility that the steering torque absolute value |Th| will exceed or fall below the threshold value Tt due to, for example, vibration of the vehicle, regardless of the driver's intention to intervene in the automatic steering control. In this case, the count amount calculating circuit 82 randomly calculates a count amount C having a positive value or a count amount C having a negative value. Thus, even when the driver does not have an intention to intervene in the automatic steering control, if the count amount C having a positive value is continuously output, the total count amount Ca' exceeds the count amount threshold value Tc and it may be erroneously determined that the driver has an intention to intervene in the automatic steering control. In view of this, in the present embodiment, the slope of the count amount C with respect to the steering torque absolute value |Th| when the steering torque absolute value |Th| is in the vicinity of the threshold value Tt is set to be smaller than the slope of the count amount C with respect to the steering torque absolute value |Th| when the steering torque absolute value |Th| is not in the vicinity of the threshold value Tt. Thus, even when the steering torque absolute value |Th| exceeds or falls below the threshold value Tt regardless of the driver's intention to intervene in the automatic steering control, the time required for the total count amount Ca' to exceed the count amount threshold value Tc increases. Thus, it is possible to prevent an erroneous determination about the driver's intention to intervene in the automatic steering control.

Hereinafter, a vehicle controller according to a second embodiment will be described. The differences from the first embodiment will be mainly described below.

Figure 4:
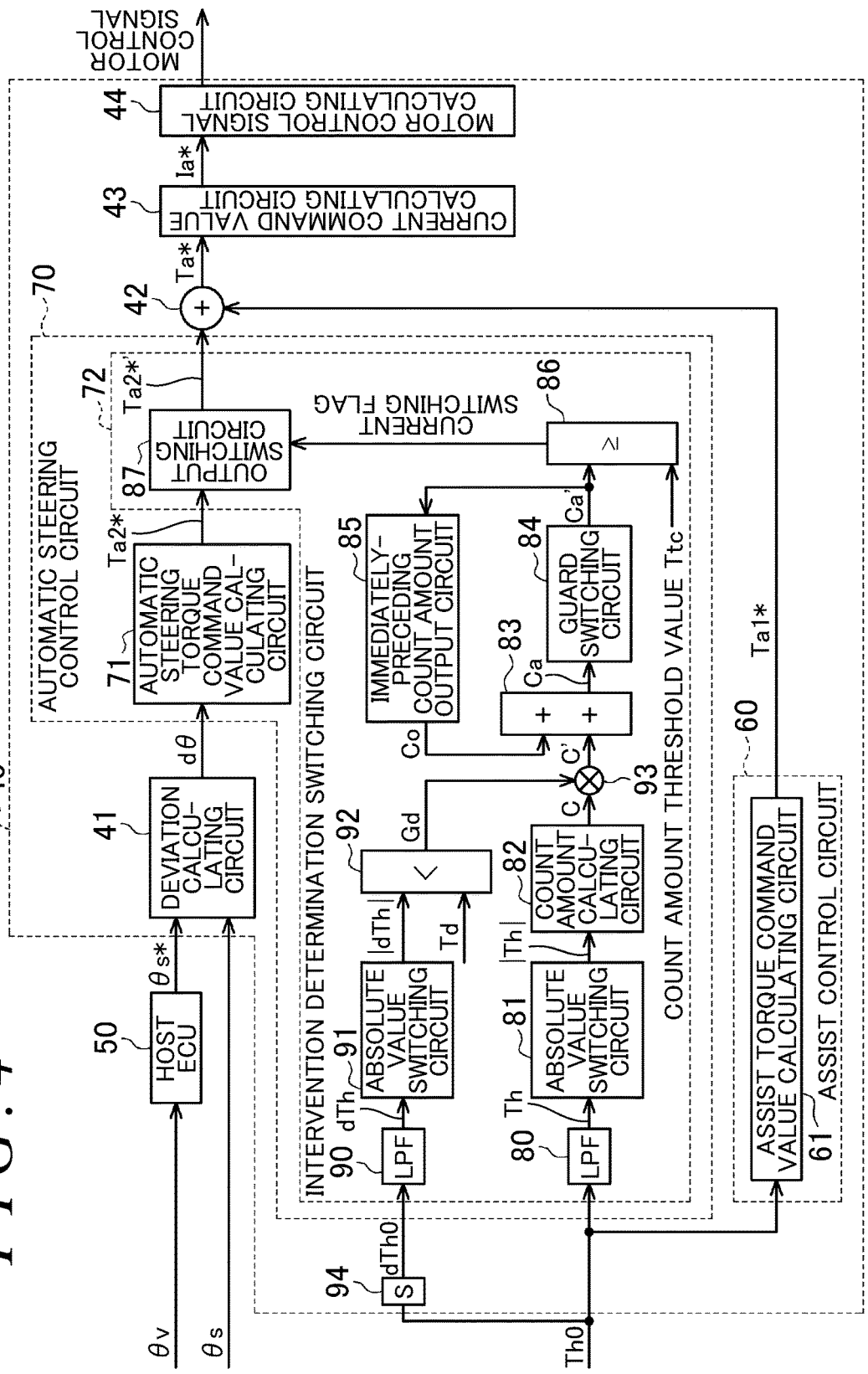
FIG. 4 is a control block diagram illustrating a vehicle controller according to a second embodiment.

As illustrated in FIG. 4, the intervention determination switching circuit 72 further includes a low-pass filter 90, an absolute value switching circuit 91, a count amount correction gain calculating circuit 92, and a multiplier circuit 93. The ECU 40 includes a differentiator 94. The differentiator 94 calculates a steering torque derivative value dTh0 by differentiating the steering torque Th0 detected by the torque sensor 31.

The low-pass filter 90 calculates a filtered steering torque derivative value dTh that is a value obtained by executing a low-pass filtering process on the steering torque derivative value dTh0 acquired from the differentiator 94. By executing the low-pass filtering process, a high-frequency component of the steering torque derivative value dTh0, which is not considered to be generated by a driver's steering operation, is reduced. The high-frequency component of the steering torque derivative value dTh0 is reduced for the following reason. When the steering torque Th0 varies so rapidly (the steering torque derivative value dTh0 is so great) that it cannot be considered that a driver performs a steering operation, it is not considered that the driver performs a steering operation.

The absolute value switching circuit 91 calculates a steering torque differential absolute value |dTh| that is an absolute value of the steering torque derivative value dTh0 that has been subjected to the low-pass filtering process. The count amount correction gain calculating circuit 92 calculates a count amount correction gain Gd based on the steering torque differential absolute value |dTh| calculated by the absolute value switching circuit 91. The count amount correction gain Gd is calculated and used to correct the count amount C calculated by the count amount calculating circuit 82. Specifically, when the steering torque differential absolute value |dTh| is equal to or greater than a steering torque differential threshold value Td, the count amount correction gain calculating circuit 92 sets the count amount correction gain Gd to zero (0), so that the count amount C is zero. When the steering torque differential absolute value |dTh| is less than the steering torque differential threshold value Td, the count amount correction gain calculating circuit 92 sets the count amount correction gain Gd to one (1), so that the count amount C is output as it is.

The multiplier circuit 93 calculates a corrected count amount C' by multiplying the count amount C calculated by the count amount calculating circuit 82, by the count amount correction gain Gd calculated by the count amount correction gain calculating circuit 92.

The adder 83 calculates a total count amount Ca that is the total sum of the corrected count amount C' calculated by the multiplier circuit 93 in the present calculation cycle and the immediately-preceding count amount Co output from the immediately-preceding count amount output circuit 85. When the count amount correction gain Gd calculated by the count amount correction gain calculating circuit 92 is zero, the corrected count amount C' is also zero. Thus, the value of the total count amount Ca' is not varied. Thus, the immediately-preceding count amount output circuit 85 stores the immediately-preceding value.

When the total count amount Ca' received from the guard switching circuit 84 is equal to or greater than the count amount threshold value Tc, the switching determination circuit 86 determines that the degree of the driver's intervention in the automatic steering control is high. When the total count amount Ca' is less than the count amount threshold value Tc, the switching determination circuit 86 determines that the degree of the driver's intervention in the automatic steering control is low. Then, the switching determination circuit 86 sets a current switching flag indicating the determination.

When the output switching circuit 87 receives the current switching flag from the switching determination circuit 86, the output switching circuit 87 decreases or maintains the second component Ta2* based on the current switching flag.

The operations and advantageous effects of the present embodiment will be described below. While the vehicle is traveling on a bumpy road surface, even when the driver just holds the steering wheel 10, there is a possibility that a larger steering torque absolute value |Th| may be generated regardless of the driver's intention to intervene in the automatic steering control. That is, while the vehicle is traveling on a bumpy road surface, larger vibration is transmitted to the vehicle and thus a larger steering torque absolute value |Th| is instantaneously generated as noise. When a larger steering torque absolute value |Th| is generated, a larger count amount C is calculated and the total count amount Ca more easily exceed the count amount threshold value Tc.

In view of this, in the vehicle steering operation system 1 according to the present embodiment, the count amount C that varies depending on road surface conditions including the degree of bumps on a road surface is corrected based on the count amount correction gain Gd that is calculated based on the steering torque differential absolute value |dTh|. That is, when the steering torque differential absolute value |dTh| is equal to or greater than the steering torque differential threshold value Td, the count amount C is set to zero by setting the count amount correction gain Gd to zero, for the following reason. The value of a steering torque that is generated due to road surface conditions varies more rapidly than a steering torque generated by a driver's steering operation, and thus the steering torque derivative value, which is a derivative value thereof, is also considered to increase rapidly.

By setting the count amount C to zero, it is possible to prevent the count amount calculated based on the steering torque generated as noise due to road surface conditions from being added to the total count amount Ca. Thus, it is possible to more accurately determine a driver's intention to intervene in the automatic steering control.

When the steering torque differential absolute value |dTh| is equal to or greater than the steering torque differential threshold value Td, the count amount correction gain calculating circuit 92 may set the count amount correction gain Gd to a value smaller than one (1) in order to reduce the count amount C. In this case, it is possible to reduce the influence of the count amount calculated according to the steering torque generated as noise.

Hereinafter, a vehicle controller according to a third embodiment will be described. The differences from the second embodiment will be mainly described below.

Figure 5:
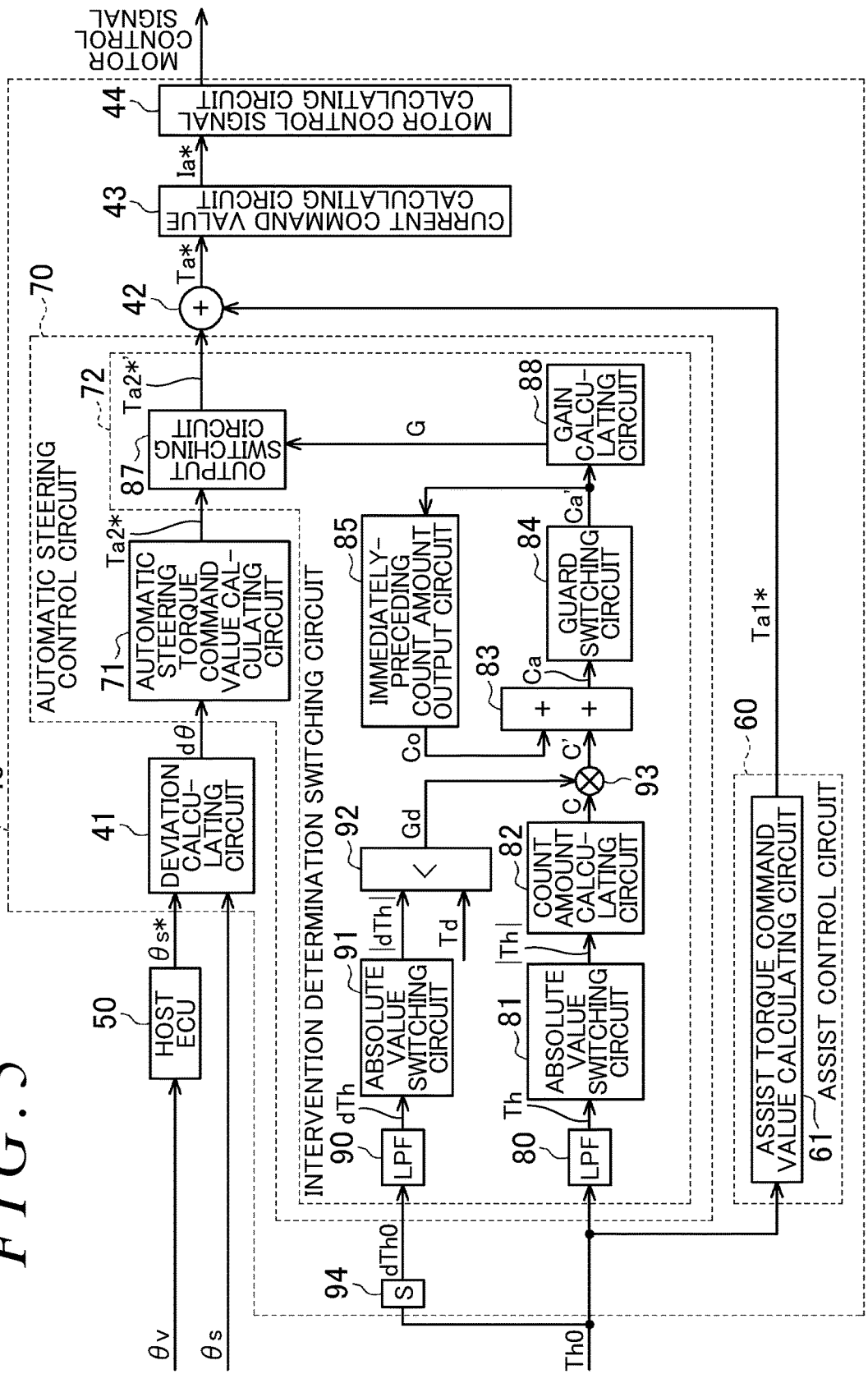
FIG. 5 is a control block diagram illustrating a vehicle controller according to a third embodiment.

As illustrated in FIG. 5, the intervention determination switching circuit 72 includes a gain calculating circuit 88 instead of the switching determination circuit 86. The gain calculating circuit 88 calculates a gain G corresponding to the total count amount Ca' calculated by the guard switching circuit 84. Specifically, the gain calculating circuit 88 calculates a smaller gain G as the total count amount Ca' increases, based on a map in which the gain G is inversely proportional to the total count amount Ca'.

Figure 6:
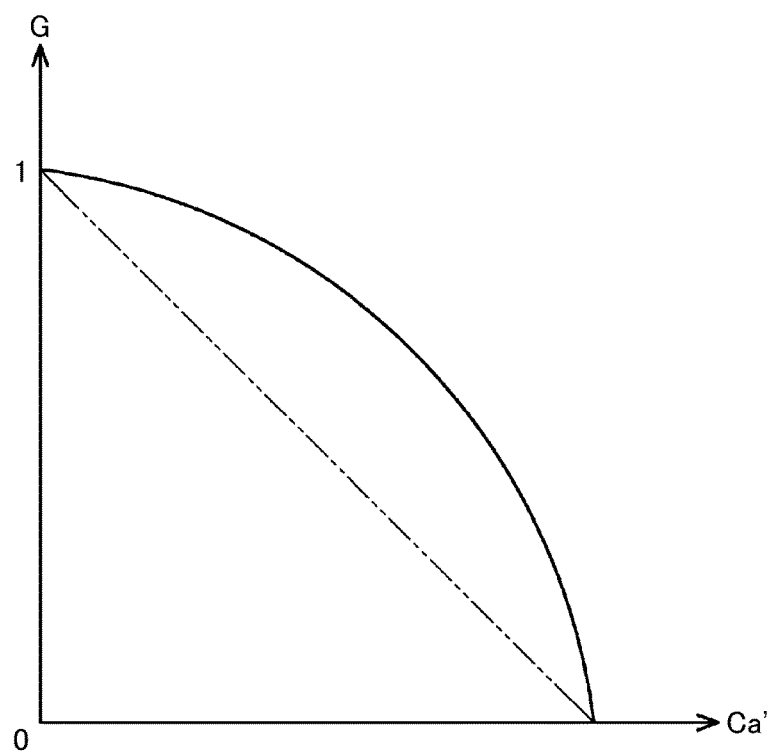
FIG. 6 is a graph illustrating the relationship between the total count amount and the gain in the vehicle controller according to the third embodiment.

As indicated by a continuous line in FIG. 6, for example, the total count amount Ca' and the gain G have such a relationship that the value of the gain G decreases exponentially as the total count amount Ca' increases.

The output switching circuit 87 calculates a second component Ta2*' by multiplying the second component Ta2* calculated by the automatic steering torque command value calculating circuit 71 by the gain G calculated by the gain calculating circuit 88.

The operations and advantageous effects of the present embodiment will be described below. The ECU 40 calculates the second component Ta2*' by calculating the gain G based on the total count amount Ca' calculated based on the steering torque Th0 and then multiplying the second component Ta2* by the gain G. The total count amount Ca' varies depending on the degree of the driver's intention to intervene in the automatic steering control. Thus, the second component Ta2*' can be varied depending on the degree of the driver's intention to intervene in the automatic steering control.

Hereinafter, a vehicle controller according to a fourth embodiment will be described. The differences from the first embodiment will be mainly described below.

Figure 7:
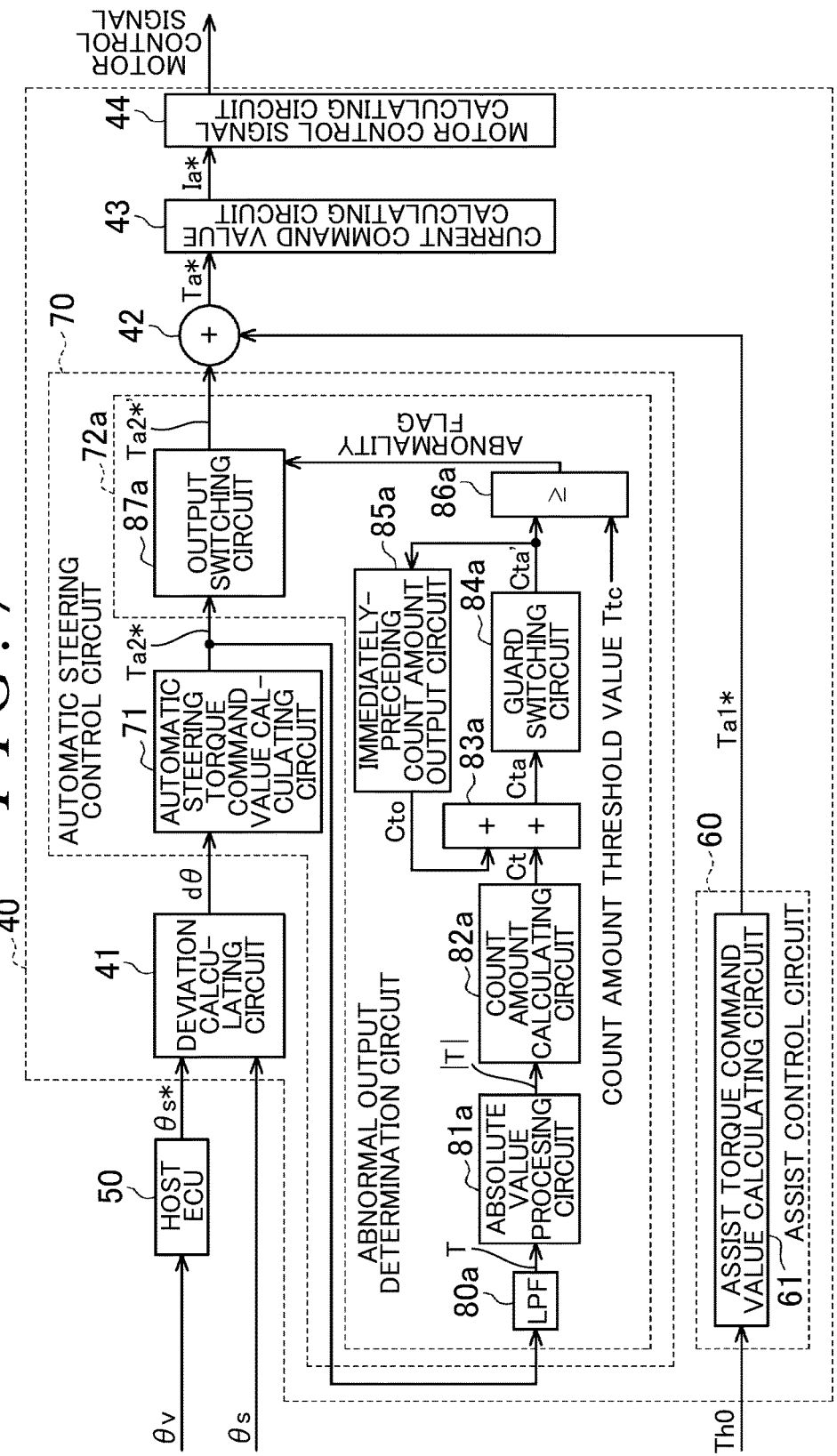
FIG. 7 is a control block diagram illustrating a vehicle controller according to a fourth embodiment.

As illustrated in FIG. 7, the automatic steering control circuit 70 includes an abnormal output determination circuit 72a instead of the intervention determination switching circuit 72. The abnormal output determination circuit 72a determines whether the second component Ta2*' is an abnormal output. Like the intervention determination switching circuit 72, the abnormal output determination circuit 72a includes a low-pass filter 80a, an absolute value switching circuit 81a, a count amount calculating circuit 82a, an adder 83a, a guard switching circuit 84a, an immediately-preceding count amount output circuit 85a, a switching determination circuit 86a, and an output switching circuit 87a.

The second component Ta2* calculated by the automatic steering torque command value calculating circuit 71 is input into the low-pass filter 80a. The low-pass filter 80a calculates a command T by executing a low-pass filtering process on the second component Ta2*.

The absolute value switching circuit 81a calculates a command absolute value |T| that is an absolute value of the command T acquired from the low-pass filter 80a. The count amount calculating circuit 82a calculates a count amount Ct having a positive value or a negative value based on the command absolute value |T| calculated by the absolute value switching circuit 81a. For example, the relationship between the command absolute value |T| and the count amount Ct is the same as the relationship between the steering torque absolute value |Th| and the count amount C in the first embodiment (see FIG. 3A). The count amount Ct is an index for determining whether or not the command (the second component Ta2*) used for the automatic steering control is an abnormal output.

The adder 83a calculates a total count amount Cta that is the total sum of the count amount Ct calculated by the count amount calculating circuit 82a in the present calculation cycle and the immediately-preceding count amount Cto output from the immediately-preceding count amount output circuit 85a.

When the total count amount Cta has a negative value, the guard switching circuit 84a calculates a total count amount Cta' that is obtained by limiting the lower limit of the total count amount Cta to zero. The immediately-preceding count amount output circuit 85a stores the present total count amount Ca' calculated by the guard switching circuit 84a as an immediately-preceding count amount Co that is used in a next calculation cycle, and outputs the stored immediately-preceding count amount Cto to the adder 83 in the next calculation cycle.

When the total count amount Cta' received from the guard switching circuit 84a is equal to or greater than the count amount threshold value Ttc, the switching determination circuit 86a sets an abnormality flag indicating an abnormality. When the total count amount Cta' is less than the count amount threshold value Ttc, the switching determination circuit 86a does not set an abnormality flag (or sets a flag indicating that there is no abnormality).

When the output switching circuit 87a receives the abnormality flag from the switching determination circuit 86a, the output switching circuit 87a sets the second component Ta2* to zero and outputs zero as the second component Ta2*. At this time, for example, the first component Ta1* is used, as it is, as the total component Ta* to calculate the current command value Ia*.

The operations and advantageous effects of the present embodiment will be described below. In the ECU 40, the abnormal output determination circuit 72a can determine whether the second component Ta2* calculated by the automatic steering torque command value calculating circuit 71 is an abnormal output, based on whether the total count amount Ca' is equal to or greater than the count amount threshold value Ttc. For example, during the automatic steering control, control in which a control output (an output corresponding to the second component Ta2*) rapidly varies within a short time, such as emergency avoidance support control or antiskid support control, may be executed. In this kind of control, the control output is less likely to be maintained to be greater than a threshold value for a long time. Thus, by determining whether the total count amount Ca' is equal to or greater than the count amount threshold value Ttc, it is possible to determine whether the control output is maintained to be greater than the threshold value for a prescribed time. Thus, it is possible to determine whether the control output of the control in which the control output varies within a short time, such as emergency avoidance support control or antiskid support control, is an abnormal output. When the control output is maintained to be equal to or greater than the threshold value for the prescribed time, it is possible to detect that the control output is an abnormal output. Thus, it is possible to prevent control from being erroneously continued due to a control output that is unintentionally generated, for example, when an abnormality occurs in a signal received from the outside via a sensor or due to erroneous calculation in the vehicle steering operation system 1.

In this case, the threshold value can be flexibly set depending on how the relationship of the count amount with respect to the control output needs to be set. The foregoing embodiments may be modified as follows. The following modified examples may be combined with each other as long as no technical contradiction arises.

Figure 3B:
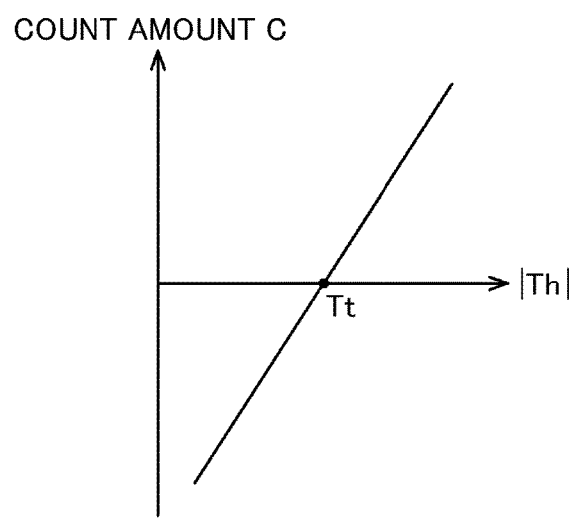
FIG. 3B is a graph illustrating the relationship between the absolute value of the steering torque and the count amount in a vehicle controller according to a modified example.

The count amount C calculated by the count amount calculating circuit 82 and the steering torque absolute value |Th| may have the relationship illustrated in FIG. 3B. That is, the count amount C may have a proportional relationship in which the count amount C simply increases with an increase in the steering torque absolute value |Th|. In this case, for example, when the steering torque absolute value |Th| is the threshold value Tt, the count amount C is zero.

Figure 3C:
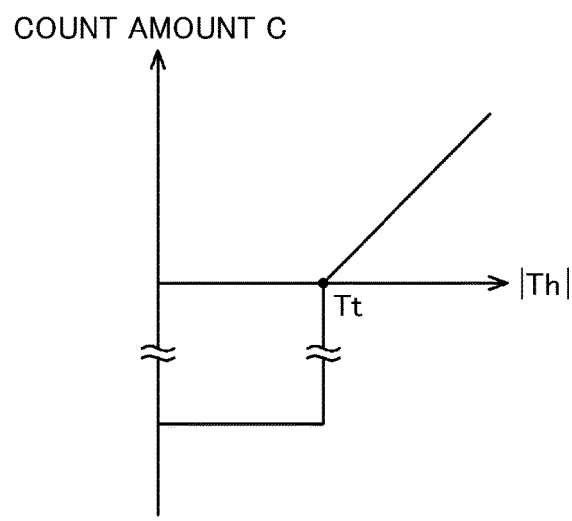
FIG. 3C is a graph illustrating the relationship between the absolute value of the steering torque and the count amount in a vehicle controller according to another modified example.

The count amount C calculated by the count amount calculating circuit 82 and the steering torque absolute value |Th| may have the relationship illustrated in FIG. 3C. That is, when the count amount C is less than the threshold value Tt, a larger count amount C having a negative value may be calculated.

The graph indicating the relationship between the count amount C and the steering torque absolute value |Th| may be as follows. The graph indicating the relationship when the steering torque absolute value |Th| is equal to or greater than the threshold value Tt and the graph indicating the relationship when the steering torque absolute value |Th| is less than the threshold value Tt may be symmetric or asymmetric with respect to the threshold value Tt. For example, the slope of the count amount C with respect to the steering torque absolute value |Th| when the steering torque absolute value |T| is equal to or greater than the threshold value Tt may be set to be larger than the slope of the count amount C with respect to the steering torque absolute value |Th| when the steering torque absolute value |Th| is less than the threshold value Tt.

In the first to third embodiments, the intervention determination switching circuit 72 is provided with the low-pass filter 80. However, the intervention determination switching circuit 72 need not be provided with the low-pass filter 80. In this case, the absolute value switching circuit 81 directly receives the steering torque Th0 and executes an absolute value process. In the second and third embodiments, the intervention determination switching circuit 72 is provided with the low-pass filter 90. However, the intervention determination switching circuit 72 need not be provided with the low-pass filter 90. In the fourth embodiment, the abnormal output determination circuit 72a is provided with the low-pass filter 80a. However, the abnormal output determination circuit 72a need not be provided with the low-pass filter 80a.

In the first to third embodiments, the intervention determination switching circuit 72 is provided with the absolute value switching circuit 81. However, the intervention determination switching circuit 72 need not be provided with the absolute value switching circuit 81. In this case, the count amount calculating circuit 82 calculates the count amount C based on the steering torque Th. In the second and third embodiments, the intervention determination switching circuit 72 is provided with the absolute value switching circuit 91. However, the intervention determination switching circuit 72 need not be provided with the absolute value switching circuit 91. In the fourth embodiment, the abnormal output determination circuit 72a is provided with the absolute value switching circuit 91. However, the abnormal output determination circuit 72a need not be provided with the absolute value switching circuit 91.

In the first to third embodiments, the intervention determination switching circuit 72 is provided with the guard switching circuit 84. However, the intervention determination switching circuit 72 need not be provided with the guard switching circuit 84. In this case, the total count amount Ca may be a negative value. However, when a driver has an intention to intervene in the automatic steering control, the count amount C is maintained at a positive value and thus the total count amount Ca becomes greater than the count amount threshold value Tc after a lapse of certain amount of time. Thus, the switching determination circuit 86 can determine that the driver has an intention to intervene in the automatic steering control. In the fourth embodiment, the abnormal output determination circuit 72a is provided with the guard switching circuit 84a. However, the abnormal output determination circuit 72a need not be provided with the guard switching circuit 84a.

In the foregoing embodiments, the immediately-preceding total count amount Ca' is output from the immediately-preceding count amount output circuit 85 (85a). However, an output from the immediately-preceding count amount output circuit 85 (85a) is not limited to the immediately-preceding total count amount Ca'. For example, the immediately-preceding count amount output circuit 85 may output the total sum of the count amounts C calculated in a prescribed past period including the immediately-preceding cycle.

The vehicle steering operation system 1 may be configured such that the control is switched from the automatic steering control to the assist control when an intervention operation is executed while setting of the automatic steering mode is indicated. The host ECU 50 may output an angle deviation dθ instead of the angle command value θs* to the ECU 40. In this case, the deviation calculating circuit 41 is provided in the host ECU 50. The host ECU 50 calculates the angle deviation dθ based on the steering angle θs acquired from the steering angle sensor 30 and the angle information θv acquired from the vehicle surrounding environment detecting device 33.

In the foregoing embodiments, the ECU 40 receives the steering angle θs from the steering angle sensor 30. However, the steering angle θs may be obtained in another method. For example, the ECU 40 may calculate the steering angle θs based on the rotation angle θm acquired from the rotation angle sensor 32. In this case, the ECU 40 can calculate the steering angle θs by calculating an absolute angle from the rotation angle θm from the rotation angle sensor 32 and multiplying the absolute angle by a conversion factor. Thus, the steering angle sensor 30 may be omitted. In this case, it is possible to reduce the number of components and achieve cost reduction.

As long as at least the steering torque Th0 is used to calculate the first component Ta1*, a vehicle speed may be used in addition to the steering torque Th0 to calculate the first component Ta1*, or other factors may be used to calculate the first component Ta1*. As long as at least the angle command value θs*, which is calculated based on the vehicle surrounding environment (the angle information θv), is used to calculate the second component Ta2*, other factors, such as a vehicle speed, may be used in addition to the angle command value θs*.

In the first to third embodiments, the intervention determination switching circuit 72 determines a driver's intention to intervene in the automatic steering control based on the steering torque Th0. However, a driver's intention to intervene in the automatic steering control may be determined in another method. For example, the intervention determination switching circuit 72 may determine a driver's intention to intervene in the steering based on the steering angle θs or may determine a driver's intention to intervene in the steering based on the current command value Ia* (actual current value).

In the fourth embodiment, the abnormal output determination circuit 72a determines whether the second component Ta2* is an abnormal output based on the second component Ta2* calculated by the automatic steering torque command value calculating circuit 71. However, whether the second component Ta2* is an abnormal output may be determined in another method. For example, the abnormal output determination circuit 72a may determine whether the second component Ta2* is an abnormal output based on the angle deviation dθ calculated by the deviation calculating circuit 41.

In the fourth embodiment, the total count amount Ca' and the gain G have the relationship indicated by the continuous line in FIG. 6. However, the relationship between the total count amount Ca' and the gain G is not limited to this. For example, the total count amount Ca' and the gain G may have a relationship in which the gain G decreases simply as the total count amount Ca' increases, as indicated by a long dashed double-short dashed line in FIG. 6.

In the foregoing embodiments, for example, the vehicle steering operation system 1 constitutes a lane departure prevention support system. However, the vehicle steering operation system 1 is not limited to a lane departure prevention support system. For example, the vehicle steering operation system 1 may constitute a parking support system, may constitute an antiskid device, or may constitute various kinds of advanced driving support systems.

In the foregoing embodiments, the invention is applied to the vehicle steering operation system 1 in which power is applied to the column shaft 11a. However, the invention may be applied to other kinds of vehicle steering operation systems. For example, the invention may be applied to a vehicle steering operation system 1 in which power is applied to the rack shaft 12.

The foregoing embodiments may be applied to a steer-by-wire steering apparatus. In this case, the actuator 3 may be disposed around the rack shaft 12.

What is claimed is:

1. A vehicle controller configured to control an actuator that generates power for steering steered wheels and that applies the power to a steering mechanism of a vehicle, the vehicle controller configured to control the actuator using at least one of a first component that is a command calculated based on an operation state quantity that varies in response to a driver's operation of the steering mechanism and a second component that is a command calculated based on a vehicle surrounding environment, the vehicle controller comprising:
a count amount calculating circuit configured to calculate a count amount that is an index for determining whether a driver has indicated an intention to intervene in the steering steered wheels, based on the operation state quantity;
a sum calculating circuit configured to calculate a sum by adding together a count amount calculated by the count amount calculating circuit and the count amount calculated in a prescribed past period by the count amount calculating circuit;
a determination circuit configured to determine whether or not the driver has an intention to intervene in the steering based on whether or not the sum calculated by the sum calculating circuit is equal to or greater than a count amount threshold value; and
a switching circuit configured to decrease the second component when the determination circuit determines that the driver has an intention to intervene in the steering, and configured to maintain the second component when the determination circuit determines that the driver does not have an intention to intervene in the steering.

2. The vehicle controller according to claim 1, wherein
the count amount calculating circuit is configured to calculate a count amount having a positive value when an absolute value of the operation state quantity is equal to or greater than a threshold value, and is configured to calculate a count amount having a negative value when the absolute value of the operation state quantity is less than the threshold value,
the sum calculating circuit is configured to calculate a total sum of the calculated count amount and a count amount calculated in the prescribed past period, as the sum, and
the determination circuit is configured to determine that the driver has an intention to intervene in the steering when the total sum of the count amounts is equal to or greater than the count amount threshold value, and is configured to determine that the driver does not have an intention to intervene in the steering when the total sum of the count amounts is less than the count amount threshold value.

3. The vehicle controller according to claim 2, further comprising a guard switching circuit configured to set a lower limit of the total sum of the count amounts to zero when the total sum of the count amounts calculated by the sum calculating circuit has a negative value.

4. The vehicle controller according to claim 1, wherein a slope of the count amount with respect to an absolute value of the operation state quantity when the absolute value of the operation state quantity is in a vicinity of a threshold value is set to be smaller than a slope of the count amount with respect to the absolute value of the operation state quantity when the absolute value of the operation state quantity is not in the vicinity of the threshold value.

5. The vehicle controller according to claim 1, wherein the operation state quantity is a steering torque that is applied to a steering wheel.

* * * * *